United States Patent
Brandt

(10) Patent No.: US 7,920,704 B2
(45) Date of Patent: *Apr. 5, 2011

(54) SYSTEMS AND METHODS FOR OBTAINING INFORMATION ON A KEY IN BB84 PROTOCOL OF QUANTUM KEY DISTRIBUTION

(75) Inventor: Howard E. Brandt, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 911 days.

This patent is subject to a terminal disclaimer.

(21) Appl. No.: 11/239,461

(22) Filed: Sep. 26, 2005

(65) Prior Publication Data
US 2009/0175450 A1    Jul. 9, 2009

Related U.S. Application Data

(60) Provisional application No. 60/617,796, filed on Oct. 9, 2004.

(51) Int. Cl.
*H04L 9/00* (2006.01)
(52) U.S. Cl. ........ 380/263; 380/283; 356/451; 356/453; 359/107; 359/108
(58) Field of Classification Search ............ 380/41, 380/44, 263; 359/107, 108; 356/451, 453
See application file for complete search history.

(56) References Cited

U.S. PATENT DOCUMENTS

| | | | |
|---|---|---|---|
| 5,243,649 A | 9/1993 | Franson | |
| 5,307,410 A | 4/1994 | Bennett | |
| 5,339,182 A | 8/1994 | Kimble et al. | |
| 5,414,771 A | 5/1995 | Fawcett, Jr. | |
| 5,515,438 A | 5/1996 | Bennett et al. | |
| 5,732,139 A | 3/1998 | Lo et al. | |
| 5,764,765 A | 6/1998 | Phoenix et al. | |
| 5,953,421 A | 9/1999 | Townsend | |
| 5,999,285 A * | 12/1999 | Brandt et al. | 398/212 |
| 6,188,768 B1 | 2/2001 | Bethune et al. | |
| 6,289,104 B1 | 9/2001 | Patterson et al. | |

(Continued)

OTHER PUBLICATIONS

Brandt, Howard E. "Probe Optimization in Four-State Protocol of Quantum Cryptography." Physical Review A, 66, 032303 (2002).*

(Continued)

*Primary Examiner* — Taghi T. Arani
*Assistant Examiner* — Gregory Lane
(74) *Attorney, Agent, or Firm* — Edward L. Stolarun; Alan I. Kalb; Lawrence E. Anderson

(57) ABSTRACT

Systems and methods for obtaining information on a key in the BB84 (Bennett-Brassard 1984) protocol of quantum key distribution are provided. A representative system comprises a quantum cryptographic entangling probe, comprising a single-photon source configured to produce a probe photon, a polarization filter configured to determine an initial probe photon polarization state for a set error rate induced by the quantum cryptographic entangling probe, a quantum controlled-NOT (CNOT) gate configured to provide entanglement of a signal with the probe photon polarization state and produce a gated probe photon so as to obtain information on a key, a Wollaston prism configured to separate the gated probe photon with polarization correlated to a signal measured by a receiver, and two single-photon photodetectors configured to measure the polarization state of the gated probe photon.

20 Claims, 3 Drawing Sheets

U.S. PATENT DOCUMENTS

| | | | |
|---|---|---|---|
| 6,314,189 | B1 | 11/2001 | Motoyoshi et al. |
| 6,438,234 | B1 | 8/2002 | Gisin et al. |
| 6,473,719 | B1 | 10/2002 | Steenblik |
| 6,522,749 | B2 | 2/2003 | Wang |
| 6,529,601 | B1 | 3/2003 | Townsend |
| 6,678,379 | B1 | 1/2004 | Mayers et al. |
| 6,678,450 | B1 | 1/2004 | Franson |
| 6,741,374 | B2 | 5/2004 | Pittman et al. |
| 6,748,081 | B1 | 6/2004 | Dultz et al. |
| 6,801,626 | B1 | 10/2004 | Nambu |
| 6,895,092 | B2 | 5/2005 | Tomita |
| 7,006,267 | B2 * | 2/2006 | Franson et al. ............... 359/107 |
| 7,292,342 | B2 * | 11/2007 | Zaugg ........................... 356/451 |
| 7,307,275 | B2 * | 12/2007 | Lidar et al. ...................... 257/31 |
| 2001/0055389 | A1 * | 12/2001 | Hughes et al. .................. 380/44 |
| 2003/0086138 | A1 * | 5/2003 | Pittman et al. ............... 359/108 |
| 2006/0056630 | A1 * | 3/2006 | Zimmer et al. ............... 380/256 |
| 2008/0240437 | A1 * | 10/2008 | Brandt .......................... 380/263 |

OTHER PUBLICATIONS

Franson, J.D., B.C. Jacobs, and T.B. Pitmann. "Experimental Demonstration of Quantum Logic Operations Using Linear Optical Elements." Fortschr. Phys. 51, No. 4-5, 369-378 (2003).*

Johnson, R. Colin. "Quantum Dots Are Used to Build Logic Gates." Apr. 28, 1999. EETimes. <http://www.eetimes.com/showArticle.jhtml?articleID=18301477>.*

Rauschenbeutel, A., et al. "Coherent Operation of a Tunable Quantum Phase Gate in Cavity QED." Physical Review Letters, vol. 83, No. 24. Dec. 13, 1999.*

N. Gisin, et al., Quantum Crptography, Rev, Mod. Phys. 74, 145-192 (2002).

S. Wiesner, "Conjugate Coding," SIGACT News 15, 78-88 (1983).

C.H. Bennett, "Quantum Cryptography Using Any Two Nonorthogonal States," Phys. Rev. Letter. 68, 3121-3124 (1992).

A.K. Ekert, "Quantum Cryptography Based on Bell's Theorem," Phys. Rev. Lett. 57, 661-663 (1991).

H.E. Brandt, "Positive Operator Valued Measure in Quantum Information Processing," Am. J. Phys. 67, 434-439 (1999).

C.H. Bennett, et al. "Generalized Privacy Amplification," IIII Trans, Inf. Theor. 41, 1915-1923 (1995).

C. H. Bennett, et al. "Experimental Quantum Cryptography," J. Cryptography 5, 3-28 (1992).

B.A. Slutsky, et al., "Security of Quantum Cryptography Against Individual Attacks," Phys. Rev. A57, 2383-2398 (1998).

C.A. Fuchs, et al. "Quantum-State Disturbance Versus Information Gain: Uncertainty Relations for Quantum Information," Phys. Rev. A53, 2038-2045 (1996).

H.E. Brandt, "Probe Optimization in Four-State Protocol of Quantum Cryptography," Phys. Rev. A66, 032303-1-16 (2002).

H.E. Brandt, "Secrecy Capacity in the Four-State Protocol of Quantum Key Distirbution," J. Math Phys. 43, 4526-4530 (2002).

H.E. Brandt, "Optimization Problem in Quantum Cryptography," J. Optics B5, S557-560. Quantum Semiclass. Opt. 5 (2003).

H.E. Brandt, "Optimum Probe Parameters for Entangling Probe in Quantum Key Distribution," Quantum Information Processing, vol. 2, Nos. 1-2, 37-79 (2003).

H.E. Brandt, "Optimized Unitary Transform for BB84 Entangling Probe," SPIE Proceedings, vol. 5436, 48-64 (2004).

G. Vidal, et al., "Universal quantum circuit for two-qubit transformations with three controlled-NOT gates," Phy. Rev. A69, 010301-1-4 (2004).

Brandt, "Eavesdropping optimization for quantum cryptography using a positive operator-valued measure," Physical Review a vol. 59, No. 4 (Apr. 1999), pp. 2665-2669.

Brandt,"Inconclusive rate as a disturbance measure in quantum cryptography," Phys. Rev. A, vol. 62, Issue 4 042310 (2000).

Brandt, "Inconclusive rate in quantum key distribution." Phys. Rev. a vol. 64 Issue 4 042316(2001).

* cited by examiner

SYSTEMS AND METHODS FOR OBTAINING INFORMATION ON A KEY IN BB84 PROTOCOL OF QUANTUM KEY DISTRIBUTION

CROSS-REFERENCE TO RELATED APPLICATION

This application claims priority to co-pending U.S. provisional application entitled, "Quantum Cryptographic Entangling Probe," having Ser. No. 60/617,796, filed Oct. 9, 2004, which is incorporated herein by reference.

GOVERNMENT INTEREST

The invention described herein may be manufactured, used, and licensed by or for the United States Government.

BACKGROUND

1. Technical Field

The present disclosure is generally related to the secure communication of encrypted data using quantum cryptography.

2. Description of the Related Art

Research efforts by many investigators have significantly advanced the field of quantum cryptography since the pioneering discoveries of Wiesner, Bennett and Brassard, as shown in the following references: N. Gisin, G. Ribordy, W. Tittel, and H. Zbinden, "Quantum cryptography," *Rev. Mod. Phys.* Vol. 74, pp. 145-195 (2002); S. Wiesner, "Conjugate coding," *SIGACT News* Vol. 15, No. 1, pp. 78-88 (1983); C. H. Bennett and G. Brassard, "Quantum cryptography, public key distribution and coin tossing," *Proceedings of the IEEE International Conference on Computers, Systems, and Signal Processing*, Bangalore, India, pp. 175-179, (IEEE 1984); C. H. Bennett and G. Brassard, "Quantum public key distribution system," IBM Tech. Discl. Bull. Vol. 28, No. 7, pp. 3153-3163, (1985), all of which are incorporated herein by reference in their entireties. Emphasis has been placed on quantum key distribution, the generation by means of quantum mechanics of a secure random binary sequence which can be used together with the Vernam cipher (one-time pad) as discussed in G. Vernam, "Cipher printing telegraph systems for secret wire and radio telegraph communications," *J. Am. Inst. Electr. Eng.* Vol. 45, pp. 295-301 (1926), which is incorporated herein by reference in its entirety, for secure encryption and decryption. Various protocols have been devised for quantum key distribution, including the single-particle four-state Bennett-Brassard protocol (BB84), Bennett (1984), the single-particle two-state Bennett protocol (B92) as in C. H. Bennett, "Quantum cryptography using any two nonorthogonal states," *Phys. Rev. Lett.* Vol. 68, pp. 3121-3124 (1992), which is incorporated herein by reference in its entirety, and the two-particle entangled-state Einstein-Podolsky-Rosen (EPR) protocol as in A. K. Ekert, "Quantum cryptography based on Bell's theorem," *Phys. Rev. Lett.* Vol. 57, pp. 661-663 (1991), which is incorporated herein by reference in its entirety. However the original BB84 protocol is presently perceived as the most practical and robust protocol.

One effective implementation of the BB84 protocol uses single photons linearly polarized along one of the four basis vectors of two sets of coplanar orthogonal bases oriented at an angle of 45 degrees (equivalently, $\pi/4$) relative to each other. The polarization measurement operators in one basis do not commute with those in the other, since they correspond to nonorthogonal polarization states. At a fundamental level, the potential security of the key rests on the fact that nonorthogonal photon polarization measurement operators do not commute, and this results in quantum uncertainty in the measurement of those states by an eavesdropping probe, as in H. E. Brandt, "Positive operator valued measure in quantum information processing," *Am. J. Phys.* Vol. 67, pp. 434-439 (1999), which is incorporated herein by reference in its entirety. Before transmission of each photon, the transmitter and receiver each independently and randomly select one of the two bases. The transmitter sends a single photon with polarization chosen at random along one of the orthogonal basis vectors in the chosen basis. The receiver makes a polarization measurement in its chosen basis. Next, the transmitter and the receiver, using a public communication channel, openly compare their choices of basis, without disclosing the polarization states transmitted or received. Events in which the transmitter and the receiver choose different bases are ignored, while the remaining events ideally have completely correlated polarization states. The two orthogonal states in each of the bases encode binary numbers 0 and 1, and thus a sequence of photons transmitted in this manner can establish a random binary sequence shared by both the transmitter and the receiver and can then serve as the secret key, following error correction and privacy amplification, as in C. H. Bennett, G. Brassard, C. Crepeau, and V. M. Maurer, "Generalized privacy amplification," *IEEE Trans. Inf. Theor*, Vol. 41, pp. 1915-1923 (1995), and C. H. Bennett, F. Bessette, G. Brassard, L. Salvail, and J. Smolin, "Experimental quantum cryptography," *J. Cryptology*, Vol. 5, pp. 3-28 (1992), both of which are incorporated herein by reference in their entireties. Privacy amplification is of course necessary because of the possibility of an eavesdropping attack, as in Gisin (2002), Bennett (1984), and Bennett (1985). Using the Vernam cipher, the key can then be used to encode a message which can be securely transmitted over an open communication line and then decoded, using the shared secret key at the receiver. (The encrypted message can be created at the transmitter by adding the key to the message and can be decrypted at the receiver by subtracting the shared secret key.)

Numerous analyses of various eavesdropping strategies have appeared in the literature, see e.g., Gisin (2002). Attack approaches include coherent collective attacks in which the eavesdropper entangles a separate probe with each transmitted photon and measures all probes together as one system, and also coherent joint attacks in which a single probe is entangled with the entire set of carrier photons. However, these approaches require maintenance of coherent superpositions of large numbers of states.

SUMMARY

Systems and methods for obtaining information on the BB84 protocol of quantum key distribution are provided. In this regard, an embodiment of a system can be implemented as follows. A single photon source is configured to produce a probe photon. A polarization filter is configured to determine an optimum initial probe photon polarization state for a set error rate induced by the device. A quantum controlled-NOT (CNOT) gate is configured to provide entanglement of a signal photon polarization state with the probe photon polarization state and produce a gated probe photon correlated with the signal photon so as to obtain information on a key. A Wollaston prism is configured to separate the gated probe photon with polarization appropriately correlated with a signal photon as measured by a receiver. Two single-photon photodetectors are configured to measure the polarization state of the gated probe photon. The CNOT gate may be further configured to provide optimum entanglement of the signal with the probe photon polarization state so as to obtain maximum Rényi information from the signal.

An embodiment of a method for obtaining information on a key in the BB84 protocol of quantum key distribution comprises the steps of: configuring a single photon source for producing a probe photon; determining an initial probe photon polarization state corresponding to a set error rate induced by a probe; entangling a signal with a probe photon polarization state and producing a gated probe photon; separating the gated probe photon with polarization correlated with a signal measured by a receiver; measuring the polarization state of the gated probe photon; accessing information on polarization-basis selection available on a public classical communication channel between the transmitter and the receiver; and determining the polarization state measured by the receiver. A quantum CNOT gate may be further configured to provide optimum entanglement of the signal with the probe photon polarization state so as to obtain maximum Rényi information from the signal.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
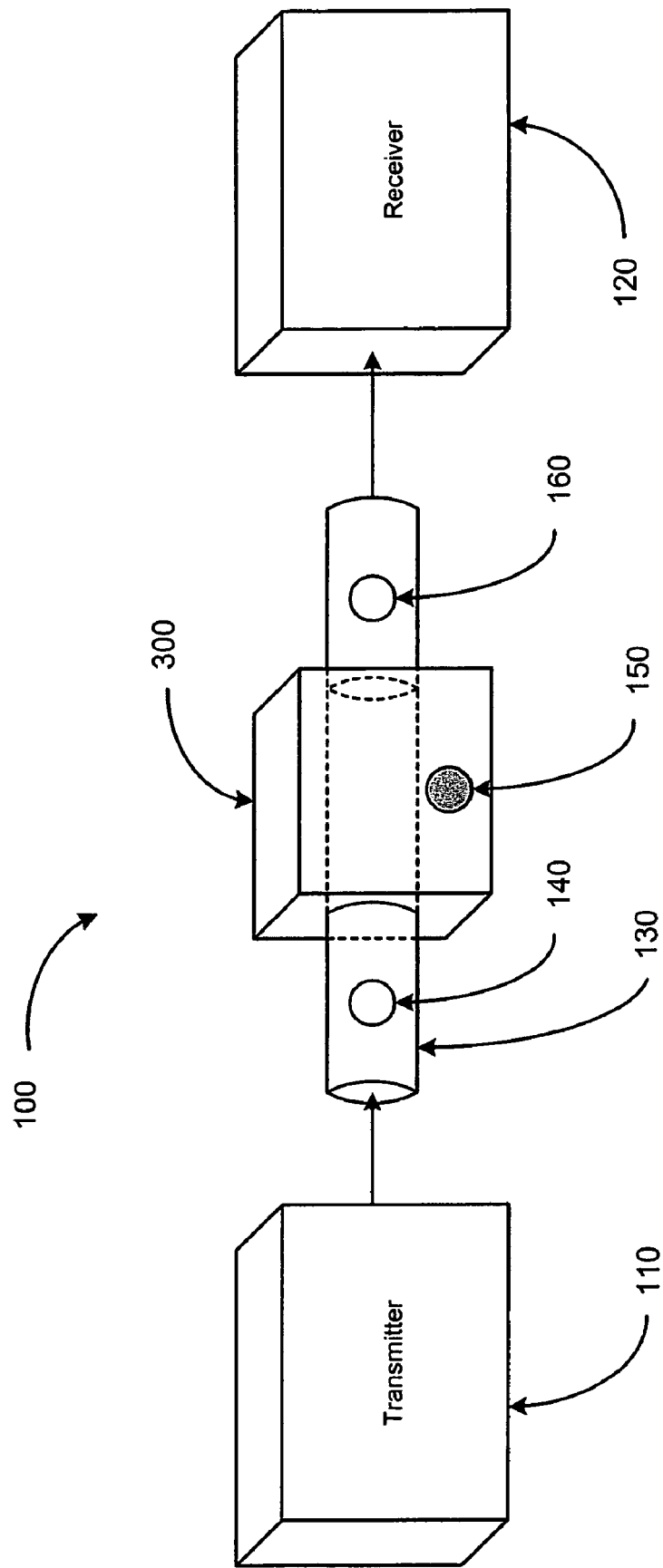
FIG. 1 is a schematic diagram of an embodiment of a system utilizing a quantum cryptographic entangling probe.

Reference is now made in detail to the description of several exemplary embodiments as illustrated in the drawings. The disclosure may, however, be embodied in many different forms and should not be construed as limited to the embodiments set forth herein; rather, these embodiments are intended to convey the scope of the disclosure to those skilled in the art. Furthermore, all "examples" given herein are intended to be non-limiting.

The present disclosure provides systems and methods for obtaining information on a key in the BB84 protocol of quantum key distribution. Some embodiments can be implemented as quantum cryptographic entangling probes for eavesdropping on the BB84 protocol.

FIG. 1 shows a system 100 utilizing a quantum cryptographic entangling probe 300 to obtain information from a transmitted signal. The quantum cryptographic entangling probe 300 is presented in greater detail in the discussion regarding FIG. 3 below. The transmitter 110 sends a signal photon 140 (an incident photon) through a quantum channel 130. The quantum channel 130 is an optical pathway and may be optical fiber or airspace, as non-limiting examples. The quantum cryptographic entangling probe 300 entangles a probe photon (not shown) with the transmitted signal photon 140 to produce a gated probe photon 150 and a gated signal photon 160. The gated signal photon 160 is relayed to the receiver 120, while the gated probe photon 150 is utilized by the quantum cryptographic entangling probe 300 to determine the state that will most likely be measured by the receiver 120 in response to receiving the gated signal photon 160.

Figure 2:
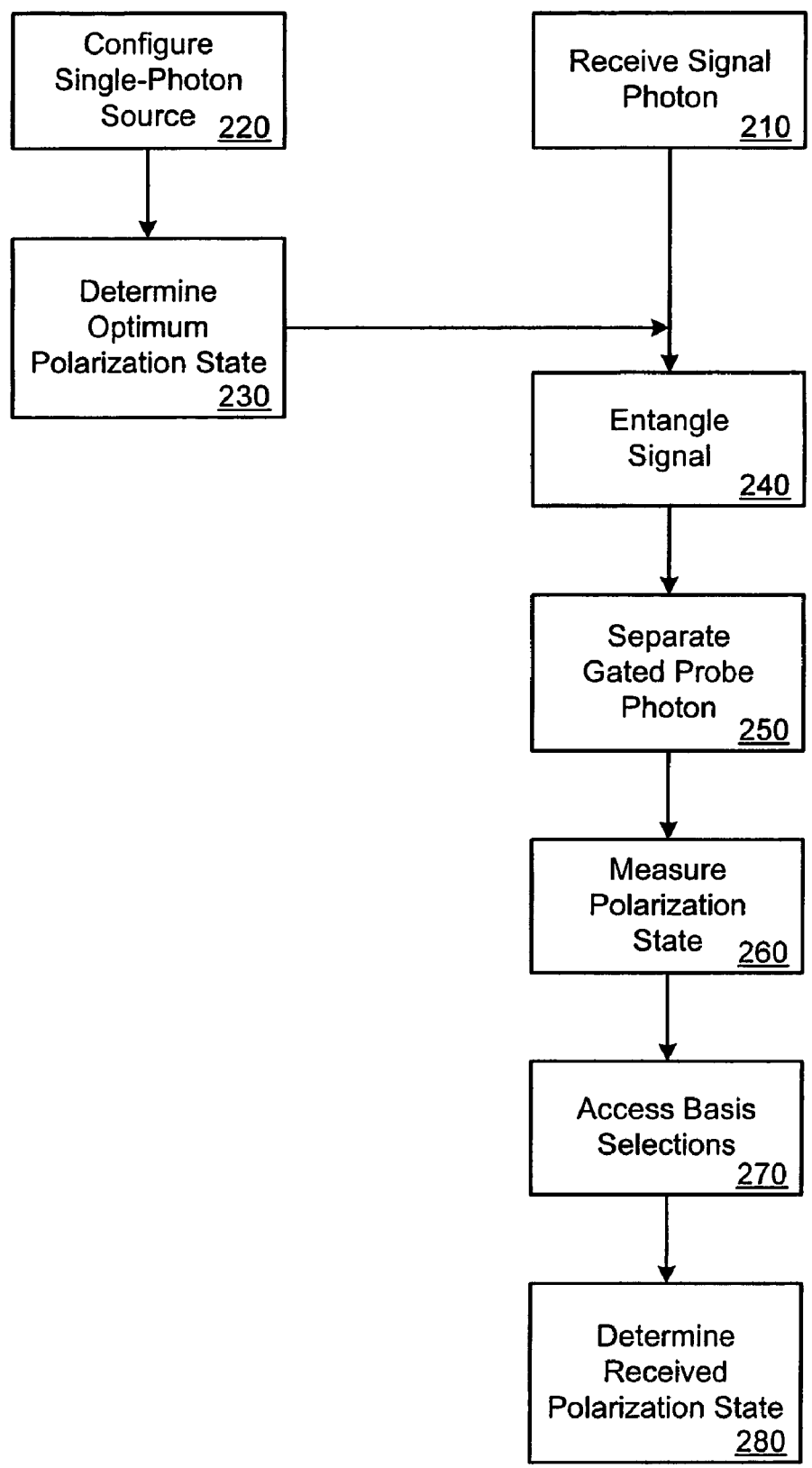
FIG. 2 is flowchart of an embodiment of a method for obtaining information on a key in BB84 protocol of quantum key distribution incorporating an embodiment of a quantum cryptographic entangling probe.

FIG. 2 is a flowchart depicting an embodiment of a method for obtaining information on a key in the BB84 protocol of quantum key distribution, and thus for determining the state most likely measured by a receiver. A signal photon 140, is received from a transmitter 110 in step 210. A single-photon source 320 (see FIG. 3) is configured for producing a probe photon in step 220. The optimum probe photon polarization state, corresponding to a set error rate induced by the quantum cryptographic entangling probe 300, is determined in step 230. In step 240, the signal photon 140 received in step 210 is entangled with the probe photon from step 230 to produce a gated probe photon 150. The gated probe photon 150 is separated with polarization correlated to a signal measured by a receiver in step 250. Step 260 shows that the polarization state of the gated probe photon 150 is measured. Finally, the information on polarization-bases selection utilized by the transmitter and receiver is accessed on a public classical communication channel in step 270 so that the polarization state measured by the receiver 120 may be determined in step 280.

For the standard four-state (BB84) protocol, Bennett (1984), of quantum key distribution in quantum cryptography, an eavesdropping probe optimization was performed, by B. A. Slutsky, R. Rao, P. C. Sun, and Y. Fainman, "Security of quantum cryptography against individual attacks," *Phys. Rev. A* Vol. 57, pp. 2383-2398 (1998), which is incorporated herein by reference in its entirety, which on average yields the most information to the eavesdropper for a given error rate caused by the probe. The most general possible probe consistent with unitarity was considered in which each individual transmitted bit is made to interact with the probe so that the carrier and the probe are left in an entangled state, and measurement by the probe, made subsequent to measurement by the legitimate receiver, yields information about the carrier state. The probe can be used in an individual attack in which each transmitted photon is measured independently, given that the polarization basis is revealed on the public communication channel. See the following references: Slutsky (1998), as above; C. A. Fuchs and A. Peres, "Quantum-state disturbance versus information gain: uncertainty relations for quantum information," *Phys. Rev. A* Vol. 53, pp. 2038-2045 (1996); H. E. Brandt, "Probe optimization in four-state protocol of quantum cryptography," *Phys. Rev. A* Vol. 66, 032303-1-16 (2002); H. E. Brandt, "Secrecy capacity in the four-state protocol of quantum key distribution," *J. Math. Phys.* Vol. 43, pp. 4526-4530 (2002); H. E. Brandt, "Optimization problem in quantum cryptography," *J. Optics B* Vol. 5, S557-560 (2003); H. E. Brandt, "Optimum probe parameters for entangling probe in quantum key distribution," *Quantum Information Processing* Vol. 2, pp. 37-79 (2003); and H. E. Brandt, "Optimized unitary transformation for BB84 entangling probe," *SPIE Proc.*, Vol. 5436, pp. 48-64 (2004), all of which are incorporated herein by reference in their entirety. It should be noted that in Equation (132) of Brandt (2004), $\sin \mu$ and $\cos \mu$ should be interchanged in the coefficient of $|w_3\rangle$ only. Also, $e_{2\theta}$ should be $e_\theta$. In Equation (195), the overall sign of the coefficient of $|w_2\rangle$ should be $\mp$, rather than $\pm$.

A complete optimization was performed by Brandt ("Probe optimization in four-state protocol of quantum cryptography," 2002, "Optimization problem in quantum cryptography," 2003, "Optimum probe parameters for entangling probe in quantum key distribution," 2003, and "Optimized unitary transformation for BB84 entangling probe," 2004 above), in which three previously unknown sets of optimum probe parameters were obtained, all yielding the identical maximum information gain by the probe. The probe optimizations were based on maximizing the Rényi information gain by the probe on corrected data for a given error rate induced by the probe in the legitimate receiver. A minimum overlap of the probe states which are correlated with the signal states (because of the entanglement) determines the maximum Rényi information gain by the probe. This is related to the idea that the more nearly orthogonal the correlated states are, the easier they are to distinguish. The upper bound on Rényi information gain by the probe is needed to calculate the secrecy capacity of the BB84 protocol and to determine the number of bits which must be sacrificed during privacy amplification in order that it be exponentially unlikely that more than token leakage of the final key be available to the eavesdropper following key distillation (see Brandt, "Secrecy capacity in the four-state protocol of quantum key distribution," 2002).

Using the simplest optimal set of probe parameters, it was shown by Brandt (2004) that the above unitary transformation representing the probe produces the following entanglements for initial probe state $|w\rangle$ and incoming BB84 signal states $|u\rangle$, $|\bar{u}\rangle$, $|v\rangle$, or $|\bar{v}\rangle$, respectively:

$$|u\rangle \otimes |w\rangle \to \frac{1}{4}(|\alpha_+\rangle \otimes |u\rangle + |\alpha\rangle \otimes |\bar{u}\rangle), \quad (1)$$

$$|\bar{u}\rangle \otimes |w\rangle \to \frac{1}{4}(|\alpha\rangle \otimes |u\rangle + |\alpha_-\rangle \otimes |\bar{u}\rangle), \quad (2)$$

$$|v\rangle \otimes |w\rangle \to \frac{1}{4}(|\alpha_-\rangle \otimes |v\rangle - |\alpha\rangle \otimes |\bar{v}\rangle), \quad (3)$$

$$|\bar{v}\rangle \otimes |w\rangle \to \frac{1}{4}(-|\alpha\rangle \otimes |v\rangle + |\alpha_+\rangle \otimes |\bar{v}\rangle), \quad (4)$$

in which the probe states $|\alpha_+\rangle$, $|\alpha_-\rangle$, and $|\alpha\rangle$ are given by $$|\alpha_+\rangle = \begin{bmatrix} (2^{1/2}+1)(1\pm\eta)^{1/2} + \\ (2^{1/2}-1)(1\mp\eta)^{1/2} \end{bmatrix} |w_0\rangle + \begin{bmatrix} (2^{1/2}+1)(1\mp\eta)^{1/2} + \\ (2^{1/2}-1)(1\pm\eta)^{1/2} \end{bmatrix} |w_3\rangle, \quad (5)$$

$$|\alpha_-\rangle = \begin{bmatrix} (2^{1/2}-1)(1\pm\eta)^{1/2} + \\ (2^{1/2}+1)(1\mp\eta)^{1/2} \end{bmatrix} |w_0\rangle + \begin{bmatrix} (2^{1/2}-1)(1\mp\eta)^{1/2} + \\ (2^{1/2}+1)(1\pm\eta)^{1/2} \end{bmatrix} |w_3\rangle, \quad (6)$$

$$|\alpha\rangle = [-(1\pm\eta)^{1/2} + (1\mp\eta)^{1/2}]|w_0\rangle + [-(1\mp\eta)^{1/2} + (1\pm\eta)^{1/2}]|w_3\rangle, \quad (7)$$

where $$\eta \equiv [8E(1-2E)]^{1/2}, \quad (8)$$

expressed in terms of the probe basis states $|w_0\rangle$ and $|w_3\rangle$, and also the set error rate E induced by the probe. Note that the Hilbert space of the probe is two-dimensional, depending on the two probe basis vectors, $|w_0\rangle$ and $|w_3\rangle$. Also, it is assumed that $E \leq \frac{1}{4}$ here and throughout. Larger induced error rates are presumably impractical. It is important to note here that in Equations (29) and (32) of Brandt (2004), the overall sign must be positive in order to yield Equation (19) of Brandt (2004). Also in Equations (5) through (7) above, the sign choices correspond to the implementation chosen here.

It is to be noted in Equation (1) that the projected probe state $|\psi_{uu}\rangle$ correlated with the correct received signal state, see Slutsky (1998) and Brandt ("Optimum probe parameters for entangling probe in quantum key distribution," 2003), in which the state $|u\rangle$ is sent by the transmitter, and is also received by the legitimate receiver, is $|\alpha_+\rangle$. Analogously, using Equation (2), it follows that the correlated probe state $|\psi_{\bar{u}\bar{u}}\rangle$ is $|\alpha_-\rangle$. The two states $|\alpha_+\rangle$ and $|\alpha_-\rangle$ are to be distinguished by the measurement of the probe. Also, according to Equations (3) and (4), the same two probe states $|\alpha_+\rangle$ and $|\alpha_-\rangle$ are the appropriate correlated states $|\psi_{\bar{v}\bar{v}}\rangle$ and $|\psi_{vv}\rangle$, respectively. This is consistent with the assumption in Section II of Slutsky (1998) that only two probe states must be distinguished by the probe.

As a basis for the present disclosure, this two-dimensional optimized unitary transformation, Equations (1) through (4), is used to show that a simple quantum circuit representing the optimal entangling probe consists of a single CNOT gate, see M. A. Nielsen and I. L. Chuang, *Quantum Computation and Quantum Information*, Cambridge University Press (2000), which is incorporated herein by reference in its entirety, in which the control qubit consists of two polarization basis states of the signal, the target qubit consists of two probe basis states, and the initial state of the probe is set in a specific way by the error rate. A method is determined below for measuring the appropriate correlated states of the probe, and a design for the entangling probe is described.

The present disclosure is a design implementation of an entangling probe which optimally entangles itself with the signal so as to obtain the maximum information on the pre-privacy amplified key in the BB84 protocol of quantum key distribution.

The quantum circuit model of quantum computation is exploited to determine the quantum circuit corresponding to the optimum unitary transformation, Equations (1) through (4). It was shown in Brandt (2004) that the tensor products of the initial state $|w\rangle$ of the probe with the orthonormal basis states $|e_0\rangle$ and $|e_1\rangle$ of the signal transform as follows (See Equation (1) and Equations (35) through (40) of Brandt (2004)), again with the positive over-all sign choice in Equation (26) of Brandt (2004):

$$|e_0\rangle \otimes w\rangle \to |e_0\rangle \otimes |A_1\rangle \quad (9)$$

and $$|e_1\rangle \otimes w\rangle \to |e_1\rangle \otimes |A_2\rangle, \quad (10)$$

expressed in terms of probe states $|A_1\rangle$ and $|A_2\rangle$, where $$|A_1\rangle = \alpha_1|w_0\rangle + \alpha_2|w_3\rangle, \quad (11)$$

$$|A_2\rangle = \alpha_2|w_0\rangle + \alpha_1|w_3\rangle, \quad (12)$$

in which $$\alpha_1 = 2^{-1/2}(1\pm\eta)^{1/2}, \quad (13)$$

$$\alpha_2 = 2^{-1/2}(1\mp\eta)^{1/2}, \quad (14)$$

and $\eta$ is given by Equation (8).

In the two-dimensional Hilbert space of the signal, the two orthogonal basis states $|e_0\rangle$ and $|e_1\rangle$ are oriented symmetrically about the signal states $|u\rangle$ and $|v\rangle$, and make angles of $\pi/8$ with the signal states $|u\rangle$ and $|v\rangle$, respectively, e.g., Slutsky (1998). Next, consider a quantum controlled-not gate (CNOT gate), in which the control qubit consists of the two signal basis states $\{|e_0\rangle, |e_1\rangle\}$, and the target qubit consists of the probe basis states $\{|w_0\rangle, |w_3\rangle\}$, and such that when $|e_0\rangle$ enters the control port then $\{|w_0\rangle, |w_3\rangle\}$ becomes $\{|w_3\rangle, |w_0\rangle\}$ at the target output port, or when $|e_1\rangle$ enters the control port then $\{|w_0\rangle, |w_3\rangle\}$ remains unchanged. It then follows that a quantum circuit affecting the transformations (9) and (10), and thereby faithfully representing the entangling probe, consists of this CNOT gate with the state $|A_2\rangle$ always entering the target port, and $\{|e_0\rangle, |e_1\rangle\}$ entering the control port. When $|e_0\rangle$ enters the control port, then $|A_2\rangle$ becomes $|A_1\rangle$, or when $|e_1\rangle$ enters the control port then $|A_2\rangle$ remains unchanged, in agreement with Equations (9) and (10) with $|w\rangle = |A_2\rangle$. According to the quantum circuit model of quantum computation, it is known that three CNOT gates are in general necessary and sufficient in order to implement an arbitrary number of unitary transformations of two qubits, G. Vidal and C. M. Dawson, "Universal quantum circuit for two-qubit transformations with three controlled-NOT gates," Phys. Rev. A Vol. 69, 010301-1-4 (2004), which is incorporated herein by reference in its entirety. In the present case, a single CNOT gate suffices to faithfully represent the optimized unitary transformation.

Next expanding the signal state $|u\rangle$ in terms of the signal basis states, using Equation (1) of Slutsky (1998), one has $$|u\rangle = \cos\frac{\pi}{8}|e_0\rangle + \sin\frac{\pi}{8}|e_1\rangle \tag{15}$$

$$|\bar{u}\rangle \equiv -\sin\frac{\pi}{8}|e_0\rangle + \cos\frac{\pi}{8}|e_1\rangle, \tag{16}$$

$$|v\rangle \equiv \sin\frac{\pi}{8}|e_0\rangle + \cos\frac{\pi}{8}|e_1\rangle, \tag{17}$$

$$|\bar{v}\rangle \equiv \cos\frac{\pi}{8}|e_0\rangle - \sin\frac{\pi}{8}|e_1\rangle. \tag{18}$$

It then follows from Equations (9), (10), and (15) that the CNOT gate affects the following transformation when the signal state $|u\rangle$ enters the control port:

$$|u\rangle \otimes |A_2\rangle \to \cos\frac{\pi}{8}|e_0\rangle \otimes |A_1\rangle + \sin\frac{\pi}{8}|e_1\rangle \otimes |A_2\rangle, \tag{19}$$

Using Equations (15) through (18), one also has $$|e_0\rangle = \cos\frac{\pi}{8}|u\rangle - \sin\frac{\pi}{8}|\bar{u}\rangle, \tag{20}$$

$$|e_1\rangle = \cos\frac{\pi}{8}|v\rangle - \sin\frac{\pi}{8}|\bar{v}\rangle, \tag{21}$$

Next substituting Equations (20) and (21) in Equation (19), one has $$|u\rangle \otimes |A_2\rangle \to \cos\frac{\pi}{8} \begin{aligned}(\cos\frac{\pi}{8}|u\rangle - \sin\frac{\pi}{8}|\bar{u}\rangle) \otimes |A_1\rangle + \\ \sin\frac{\pi}{8}(\cos\frac{\pi}{8}|v\rangle - \sin\frac{\pi}{8}|\bar{v}\rangle) \otimes |A_2\rangle,\end{aligned} \tag{22}$$

and using $$\sin\frac{\pi}{8} = \frac{1}{2}(2 - 2^{1/2})^{1/2}, \tag{23}$$

$$\cos\frac{\pi}{8} = \frac{1}{2}(2 + 2^{1/2})^{1/2}, \tag{24}$$

then Equation (22) becomes $$|u\rangle \otimes |A_2\rangle \to \frac{1}{4}\begin{bmatrix}(2+2^{1/2})|A_1\rangle \otimes |u\rangle - 2^{1/2}|A_1\rangle \otimes |\bar{u}\rangle + \\ 2^{1/2}|A_2\rangle \otimes |v\rangle - (2-2^{1/2})|A_2\rangle \otimes |\bar{v}\rangle\end{bmatrix}, \tag{25}$$

From Equations (15) through (18) and Equations (20), (21), (23), and (24), it follows that $$|v\rangle = 2^{-1/2}|u\rangle + 2^{-1/2}|\bar{u}\rangle, \tag{26}$$

$$|\bar{v}\rangle = 2^{-1/2}|u\rangle - 2^{-1/2}|\bar{u}\rangle, \tag{27}$$

$$|u\rangle = 2^{-1/2}|v\rangle + 2^{-1/2}|\bar{v}\rangle, \tag{28}$$

$$|\bar{u}\rangle = 2^{-1/2}|v\rangle - 2^{-1/2}|\bar{v}\rangle. \tag{29}$$

Then substituting Equations (26) and (27) in Equation (25), and using Equations (5), and (6), one obtains Equation (1). Analogously, one also obtains Equations (2) through (4).

One concludes that the quantum circuit consisting of the CNOT gate does in fact faithfully represent the action of the optimum unitary transformation in entangling the signal states $|u\rangle$, $|\bar{u}\rangle$, $|v\rangle$, and $|\bar{v}\rangle$ with the probe states $|\alpha_+\rangle$, $|\alpha_-\rangle$, and $|\alpha\rangle$. It is to be emphasized that the initial state of the probe must be $|A_2\rangle$, given by Equation (12). (A sign choice in Equations (13) and (14) is made below, consistent with the measurement procedure defined there.)

According to Equations (1) through (4), and the above analysis, the probe produces the following entanglements for initial probe state $|w\rangle = |A_2\rangle$ and incoming signal states $|u\rangle$, $|\bar{u}\rangle$, $|v\rangle$, or $|\bar{v}\rangle$, respectively:

$$|u\rangle \otimes |A_2\rangle \to \frac{1}{4}(|\alpha_+\rangle \otimes |u\rangle + |\alpha\rangle \otimes |\bar{u}\rangle), \tag{30}$$

$$|\bar{u}\rangle \otimes |A_2\rangle \to \frac{1}{4}(|\alpha\rangle \otimes |u\rangle + |\alpha_-\rangle \otimes |\bar{u}\rangle), \tag{31}$$

$$|v\rangle \otimes |A_2\rangle \to \frac{1}{4}(|\alpha_-\rangle \otimes |v\rangle - |\alpha\rangle \otimes |\bar{v}\rangle), \tag{32}$$

$$|\bar{v}\rangle \otimes |A_2\rangle \to \frac{1}{4}(-|\alpha\rangle \otimes |v\rangle + |\alpha_+\rangle \otimes |\bar{v}\rangle). \tag{33}$$

Then, according to Equations (30) and (31), if, following the public reconciliation phase of the BB84 protocol, the signal basis mutually selected by the legitimate transmitter and receiver is publicly revealed to be $\{|u\rangle, |\bar{u}\rangle\}$, then the probe measurement must distinguish the projected probe state $|\alpha_+\rangle$, when the signal state $|u\rangle$ is both sent and received, from the projected probe state $|\alpha_-\rangle$, when the signal state $|\bar{u}\rangle$ is both sent and received. In this case one has the correlations:

$$|u\rangle \Leftrightarrow |\alpha_+\rangle, \tag{34}$$

$$|\bar{u}\rangle \Leftrightarrow |\alpha_-\rangle. \tag{35}$$

The same two states $|\alpha_+\rangle$ and $|\alpha_-\rangle$ must be distinguished, no matter which basis is chosen during reconciliation. Thus, according to Equations (32) and (33), if, following the public reconciliation phase of the BB84 protocol, the signal basis mutually selected by the legitimate transmitter and receiver is publicly revealed to be $\{|v\rangle, |\bar{v}\rangle\}$, then the probe measurement must distinguish the projected probe state $|\alpha_-\rangle$, when the signal state $|v\rangle$ is both sent and received, from the projected probe state $|\alpha_+\rangle$, when the signal state $|\bar{v}\rangle$ is both sent and received. In this case one has the correlations:

$$|v\rangle \Leftrightarrow |\alpha_-\rangle, \tag{36}$$

$$|\bar{v}\rangle \Leftrightarrow |\alpha_+\rangle. \tag{37}$$

Next, one notes that the correlations of the projected probe states $|\alpha_+\rangle$ and $|\alpha_-\rangle$ with the probe's two orthogonal basis states $|w_0\rangle$ and $|w_3\rangle$ are indicated, according to Equations (5) and (6), by the following probabilities:

$$\frac{|\langle w_0 | \alpha_+ \rangle|^2}{|\alpha_+|^2} = \frac{|\langle w_3 | \alpha_- \rangle|^2}{|\alpha_-|^2} \tag{38}$$
$$= \frac{1}{2} \pm \frac{[E(1-2E)]^{1/2}}{(1-E)},$$

$$\frac{|\langle w_0 | \alpha_- \rangle|^2}{|\alpha_-|^2} = \frac{|\langle w_3 | \alpha_+ \rangle|^2}{|\alpha_+|^2} \tag{39}$$
$$= \frac{1}{2} \mp \frac{[E(1-2E)]^{1/2}}{(1-E)}.$$

At this point, the positive sign is chosen in Equation (38), and correspondingly the negative sign in Equation (39). This choice serves to define the Hilbert-space orientation of the probe basis states, in order that the probe basis state $|w_0\rangle$ be dominantly correlated with the signal states $|u\rangle$ and $|\bar{v}\rangle$, and that the probe basis state $|w_3\rangle$ be dominantly correlated with the signal states $|\bar{u}\rangle$ and $|v\rangle$. With this sign choice, then Equations (38) and (39) become $$\frac{|\langle w_0 | \alpha_+ \rangle|^2}{|\alpha_+|^2} = \frac{|\langle w_3 | \alpha_- \rangle|^2}{|\alpha_-|^2} \tag{40}$$
$$= \frac{1}{2} + \frac{[E(1-2E)]^{1/2}}{(1-E)},$$

$$\frac{|\langle w_0 | \alpha_- \rangle|^2}{|\alpha_-|^2} = \frac{|\langle w_3 | \alpha_+ \rangle|^2}{|\alpha_+|^2} \tag{41}$$
$$= \frac{1}{2} - \frac{[E(1-2E)]^{1/2}}{(1-E)},$$

and one then has the following state correlations.

$$|\alpha_+\rangle \Leftrightarrow |w_0\rangle, \tag{42}$$

$$|\alpha_-\rangle \Leftrightarrow |w_3\rangle. \tag{43}$$

Next combining the correlations (36), (37), (42), and (43), one then establishes the following correlations:

$$\{|u\rangle, |\bar{v}\rangle\} \Leftrightarrow |\alpha_+\rangle \Leftrightarrow |w_0\rangle, \tag{44}$$

$$\{|\bar{u}\rangle, |v\rangle\} \Leftrightarrow |\alpha_-\rangle \Leftrightarrow |w_3\rangle, \tag{45}$$

to be implemented by the probe measurement method. This can be simply accomplished by a von Neumann-type projective measurement of the orthogonal probe basis states $|w_0\rangle$ and $|w_3\rangle$, implementing the probe projective measurement operators $\{|w_0\rangle\langle w_0|, |w_3\rangle\langle w_3|\}$. The chosen geometry in the two-dimensional Hilbert space of the probe is such that the orthogonal basis states $|w_0\rangle$ and $|w_3\rangle$ make equal angles with the states $|\alpha_+\rangle$ and $|\alpha_-\rangle$, respectively, and the sign choice is enforced in Equations (5) and (6), namely, $$|\alpha_+\rangle = \left[\frac{(2^{1/2}+1)(1+\eta)^{1/2} +}{(2^{1/2}-1)(1-\eta)^{1/2}}\right]|w_0\rangle + \left[\frac{(2^{1/2}+1)(1-\eta)^{1/2} +}{(2^{1/2}-1)(1+\eta)^{1/2}}\right]|w_3\rangle, \tag{46}$$

$$|\alpha_-\rangle = \left[\frac{(2^{1/2}+1)(1-\eta)^{1/2} +}{(2^{1/2}-1)(1+\eta)^{1/2}}\right]|w_0\rangle + \left[\frac{(2^{1/2}+1)(1+\eta)^{1/2} +}{(2^{1/2}-1)(1-\eta)^{1/2}}\right]|w_3\rangle, \tag{47}$$

where $$\eta = [8E(1-2E)]^{1/2}, \tag{48}$$

as in Equation (8). This geometry is consistent with the symmetric von Neumann test, which is an important part of the optimization.

An object of the present disclosure is to provide an eavesdropping probe for obtaining maximum information on the pre-privacy-amplified key in the BB84 protocol of quantum key distribution. In a preferred embodiment, the device is a probe that entangles itself separately with each signal photon on its way between the legitimate sender and receiver, in such a way as to obtain maximum information on the pre-privacy-amplified key.

An incident photon coming from the legitimate transmitter is received by the probe in one of the four signal-photon linear-polarization states $|u\rangle$, $|\bar{u}\rangle$, $|v\rangle$, or $|\bar{v}\rangle$ in the BB84 protocol. The signal photon enters the control port of the CNOT gate. The initial state of the probe is a photon in linear-polarization state $|A_2\rangle$ and entering the target port of the CNOT gate. The probe photon is produced by a single-photon source and is appropriately timed with reception of the signal photon by first sampling a few successive signal pulses to determine the repetition rate of the transmitter. The linear-polarization state $|A_2\rangle$, according to Equations (12) through (14) and Equation (8), with the sign choice made above, is given by $$|A_2\rangle = \begin{bmatrix} \frac{1}{2}\{1 - [8E(1-2E)]^{1/2}\} \end{bmatrix}^{1/2} |w_0\rangle + \begin{bmatrix} \frac{1}{2}\{1 + [8E(1-2E)]^{1/2}\} \end{bmatrix}^{1/2} |w_3\rangle, \tag{49}$$

and can be simply set for an error rate E by means of a polarizer. In this way the device can be tuned to the chosen error rate ($E \leq 1/4$) induced by the probe. The outgoing gated signal photon is relayed on to the legitimate receiver, and the gated probe photon enters a Wollaston prism, oriented to separate orthogonal photon linear-polarization states $|w_0\rangle$ and $|w_3\rangle$, and the photon is then detected by one of two photodetectors. If the basis, revealed during the public basis-reconciliation phase of the BB84 protocol, is $\{|u\rangle, |\bar{u}\rangle\}$, then the photodetector located to receive the polarization state $|w_0\rangle$ or $|w_3\rangle$, respectively, will indicate, in accord with the correlations (44) and (45), that a state $|u\rangle$ or $|\bar{u}\rangle$, respectively, was most likely measured by the legitimate receiver. Alternatively, if the announced basis is $\{|v\rangle, |\bar{v}\rangle\}$, then the photodetector located to receive the polarization state $|w_3\rangle$ or $|w_0\rangle$, respectively, will indicate, in accord with the correlations (44) and (45), that a state $|v\rangle$ or $|\bar{v}\rangle$, respectively, was most likely measured by the legitimate receiver. By comparing the record of probe photodetector triggering with the sequence of bases revealed during reconciliation, then the likely sequence of ones and zeroes constituting the key, prior to privacy amplification, can be assigned. In any case the net effect is to yield, for a set error rate E, the maximum information gain to the probe, which is given by Equation (19) of Brandt (2004), namely, $$I_{opi}^R = \log_2\left[2 - \left(\frac{1-3E}{1-E}\right)^2\right]. \tag{50}$$

The geometry of the initial and shifted probe polarization states $|A_2\rangle$ and $|A_1\rangle$, respectively, and probe basis states, $|w_0\rangle$ and $|w_3\rangle$, in the two-dimensional Hilbert space of the probe is such that the angle $\delta_0$ between the probe state $|A_1\rangle$ and the probe basis state $|w_0\rangle$ is given by $$\delta_0 = \cos^{-1}\left(\frac{\langle w_0|A_1\rangle}{|A_1|}\right), \tag{51}$$

or, substituting $|A_1\rangle$, given by Equations (11), (13), and (14) with the sign choice made in Equation (49), namely, $$|A_1\rangle = \begin{bmatrix}\frac{1}{2}\{1 + [8E(1-2E)]^{1/2}\}\end{bmatrix}^{1/2}|w_0\rangle + \begin{bmatrix}\frac{1}{2}\{1 - [8E(1-2E)]^{1/2}\}\end{bmatrix}^{1/2}|w_3\rangle, \tag{52}$$

in Equation (51), one obtains $$\delta_0 = \cos^{-1}\left(\frac{1}{2}\{1 + [8E(1-2E)]^{1/2}\}\right)^{1/2}. \tag{53}$$

This is also the angle between the initial linear-polarization state $|A_2\rangle$ of the probe and the probe basis state $|w_3\rangle$. Also, the shift $\delta$ in polarization between the initial probe states $|A_2\rangle$ and the state $|A_1\rangle$ (the angle between $|A_1\rangle$ and $|A_2\rangle$) is given by $$\delta = \cos^{-1}\left(\frac{\langle A_1|A_2\rangle}{|A_1||A_2|}\right), \tag{54}$$

or, substituting Equations (49) and (52), one obtains $$\delta = \cos^{-1}(1-4E). \tag{55}$$

Possible implementations of the CNOT gate may include ones based on cavity-QED, solid state, and/or linear optics.

Figure 3:
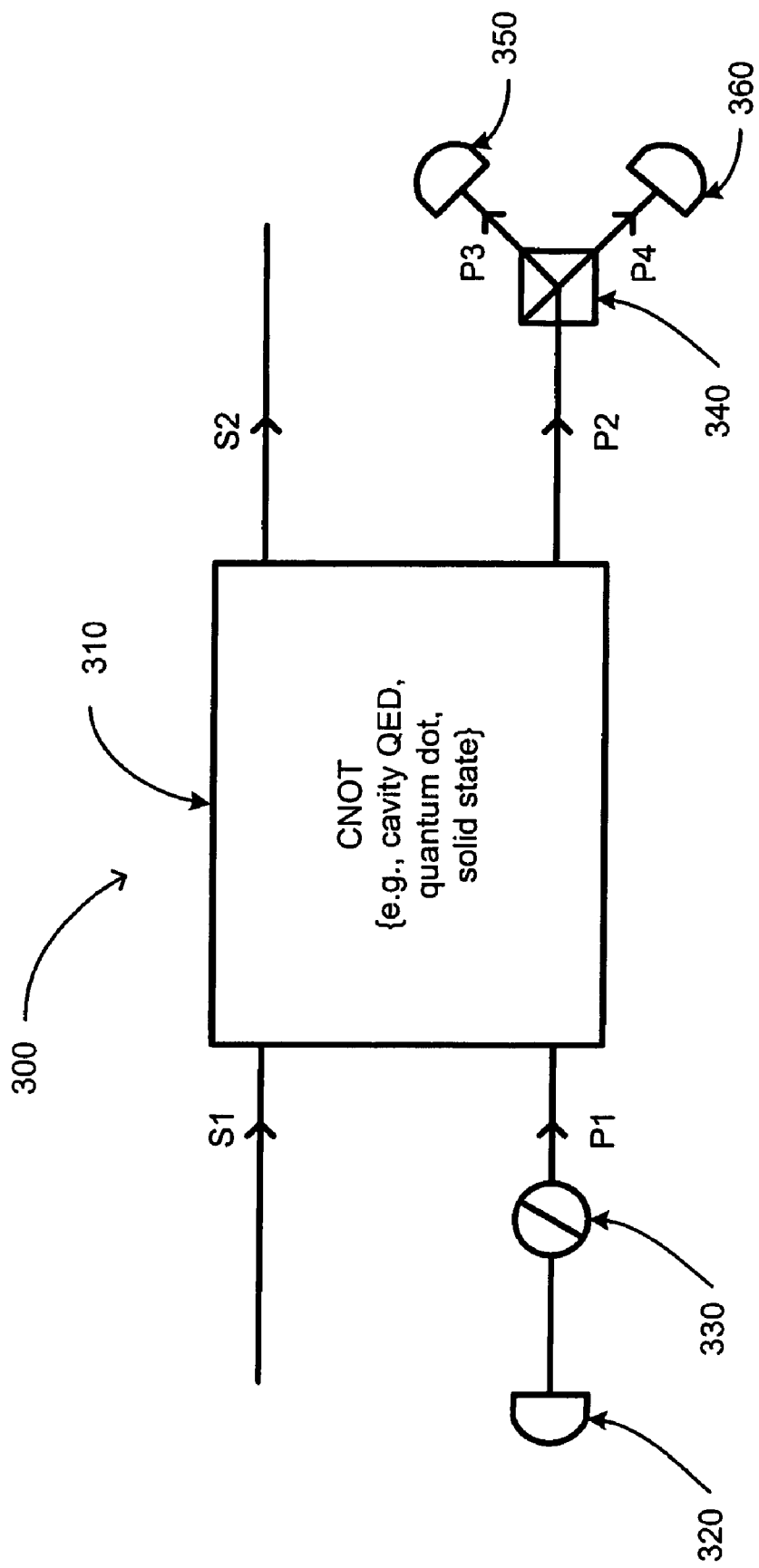
FIG. 3 is a schematic diagram of another embodiment of a system for obtaining information on a key in BB84 protocol of quantum key distribution incorporating an embodiment of a quantum cryptographic entangling probe.

FIG. 3 shows a system for obtaining information on a key in the BB84 protocol of quantum key distribution. The embodiment in FIG. 3 is a circuit design for a quantum cryptographic entangling probe 300. The straight lines with arrows represent possible optical pathways (in optical fiber or in free space) of the signal photon 140 and the probe photon to move through the quantum cryptographic entangling probe 300. The path labeled S1 is the incoming path for a signal photon 140 from the transmitter 110 in one of four possible BB84 signal states $\{|u\rangle, |\bar{u}\rangle, |v\rangle, |\bar{v}\rangle\}$. The path labeled S2 is the path of the gated signal photon 160 on its way to the legitimate receiver 120. The path labeled P1 is the path of the probe photon produced by a single photon source 320 and passing through a set polarization filter (linear polarizer) 330 prior to entering the target port of the CNOT gate 310. The path P2 is that of the gated probe photon 150 on its way to the Wollaston prism 340, and the paths P3 and P4 are possible paths of the gated probe photon 150 from the Wollaston prism 340 to the photodetectors 350 and 360.

The quantum circuit, faithfully representing the optimum entangling probe, consists of a single quantum-controlled not gate (CNOT gate) 310 in which the control qubit consists of two photon-polarization basis states of the signal, the target qubit consists of the two probe-photon polarization basis states, and the probe photon is prepared in the initial linear-polarization state, Equation (49), set by the induced error rate. The initial polarization state of the probe photon can be produced by a single-photon source 320 together with a linear polarizer 330. The probe photon can be appropriately timed with reception of a signal photon by first sampling a few successive signal pulses to determine the repetition rate of the transmitter 110. The gated probe photon 150, optimally entangled with the signal, enters a Wollaston prism 340, which separates the appropriate correlated states of the probe photon to trigger one or the other of two photodetectors 350 or 360. Basis selection, revealed on the public channel during basis reconciliation in the BB84 protocol, is exploited to correlate photodetector clicks with the signal transmitting the key, and to assign the most likely binary numbers, 1 or 0, such that the information gain by the quantum cryptographic entangling probe 300 of the key, prior to privacy amplification, is maximal. Explicit design parameters for the entangling probe are analytically specified, including: (1) the explicit initial polarization state of the probe photon, Equation (49); (2) the transition state of the probe photon, Equation (52); (3) the probabilities that one or the other photodetector triggers corresponding to a 0 or 1 of the key, Equations (40) and (41); (4) the relative angles between the various linear-polarization states in the Hilbert space of the probe, Equations (53) and (55); and (5) the information gain by the probe, Equation (50).

The quantum cryptographic entangling probe 300 is a simple special-purpose quantum information processor that will improve the odds for an eavesdropper in gaining access to the pre-privacy-amplified key, as well as imposing a potentially severe sacrifice of key bits during privacy amplification (Brandt, "Secrecy capacity in the four-state protocol of quantum key distribution," 2002). The quantum cryptographic entangling probe 300 measures the maximum information on the pre-privacy amplified key in the BB84 protocol of quantum key distribution.

It should be emphasized that the above-described embodiments of the present disclosure, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure.

The invention claimed is:

1. A system for eavesdropping on a four state quantum key distribution protocol, comprising:
   providing a quantum cryptographic entangling probe comprising:
   a single-photon probe creator for the purpose of eavesdropping on quantum key distribution;
   a photon polarization state filter to tune the polarization state of the probe photon produced by said single photon probe creator to the photon polarization state for a set error rate induced by the quantum cryptographic entangling probe;
   a quantum controlled-NOT (CNOT) gate configured to provide entanglement of a signal photon polarization state with the probe photon polarization state and produce a gated probe photon so as to obtain information on a key;
   a Wollaston prism in communication with said CNOT gate configured to separate the gated probe photon with polarization correlated to a signal measured by a legitimate receiver; and
   two single-photon photo detectors for the purpose of eavesdropping on quantum key distribution in communication with said Wollaston prism configured to measure the polarization state of the gated probe photon.

2. The system of claim 1, wherein the quantum CNOT gate is further configured to provide optimum entanglement of the signal with the probe photon polarization state to produce the gated probe photon so as to obtain maximum Renyi information from the signal.

3. The system of claim 1, wherein the signal polarization state remains substantially unaffected.

4. The system of claim 1, wherein the CNOT gate is one of a quantum dot implementation or a cavity QED implementation.

5. The system of claim 1, wherein the CNOT gate is a solid state implementation.

6. The system of claim 1, wherein the CNOT gate is a linear optics implementation.

7. A method for obtaining eavesdropping information on a four state quantum key distribution protocol, said method comprising:
   providing a single-photon probe producer;
   inducing a polarization state corresponding to a set error rate;
   interacting a probe photon with a signal state and producing a gated probe photon with a polarization state so as to obtain information on a key;
   photodetecting the gated probe photon with polarization correlated with a signal measured by a legitimate receiver;
   extracting information on polarization-basis selection available on a public classical communication channel between the transmitter and the legitimate receiver; and
   determining the polarization state measured by the probe receiver.

8. The method of claim 7, wherein the interacting comprises entangling the signal with the probe photon polarization state so as to obtain maximum Renyi information from the signal.

9. The method of claim 7, further comprising receiving a signal photon from a transmitter for the purpose of timing prior to the configuring of the single-photon source.

10. The method of claim 7, further comprising relaying an outgoing gated signal photon to the receiver.

11. The method of claim 7, wherein the probe receiver utilizes a Wollaston prism.

12. The method of claim 7, wherein the probe receiver utilizes a polarization beam splitter.

13. The method of claim 7, wherein the single-photon is timed by receiving a signal photon from a transmitter by first sampling successive signal pulses to determine a repetition rate of the transmitter.

14. A system for obtaining eavesdropping information on a four state quantum key distribution protocol, comprising:
   means for producing a single probe photon;
   means for determining a polarization state corresponding to a set error rate;
   means for correlating the probe photon polarization state with at least one photon from the quantum key;
   means for routing the probe photon;
   means for photo detecting the probe photon; and
   means for extracting information available on a public classical communication channel between the transmitter and the receiver.

15. The system of claim 14, further comprising means for receiving a signal photon from a transmitter.

16. The system of claim 14, further comprising means for relaying an outgoing signal photon to a receiver.

17. The system of claim 14, further comprising means for providing entanglement of the signal with the probe photon polarization state so as to obtain maximum Renyi information from the signal.

18. The system of claim 14, further comprising means for timing the probe single-photon by receiving a signal photon from a transmitter by first sampling successive signal pulses to determine a repetition rate of the transmitter.

19. The system of claim 14 wherein the means for correlating comprises a CNOT gate.

20. The system of claim 14 wherein the polarization states of the photons transmitting the quantum key are detected by the means for correlating without substantially effecting the photons in the quantum key such that the intended recipient of the quantum key is unaware of the detection.

* * * * *